(12) United States Patent
Tamura et al.

(10) Patent No.: US 8,501,836 B2
(45) Date of Patent: Aug. 6, 2013

(54) ADHESIVE COMPOSITION

(75) Inventors: Hiroshi Tamura, Okazaki (JP); Takaaki Nagano, Aichi-gun (JP)

(73) Assignee: Aisin Kako Kabushiki Kaisha, Aichi-ken (JP)

( * ) Notice: Subject to any disclaimer, the term of this patent is extended or adjusted under 35 U.S.C. 154(b) by 180 days.

(21) Appl. No.: 12/695,540

(22) Filed: Jan. 28, 2010

(65) Prior Publication Data
US 2010/0204386 A1 Aug. 12, 2010

(30) Foreign Application Priority Data

Feb. 6, 2009 (JP) .................................. 2009-026360

(51) Int. Cl.
*C08L 51/00* (2006.01)
(52) U.S. Cl.
USPC ............................. 523/201; 524/522; 524/523
(58) Field of Classification Search
USPC .................................. 523/201; 524/522, 523
See application file for complete search history.

(56) References Cited

U.S. PATENT DOCUMENTS

| 4,900,771 A * | 2/1990 | Gerace et al. ................. 524/296 |
| 4,959,399 A * | 9/1990 | Huynh-Tran ................. 523/437 |
| 6,342,561 B1 * | 1/2002 | Engel et al. .................... 524/503 |
| 2004/0034143 A1 * | 2/2004 | Hubert et al. ................. 524/418 |

FOREIGN PATENT DOCUMENTS

| JP | 07-082549 A | | 3/1995 |
| JP | 10017824 A | * | 1/1998 |
| JP | 2006063102 A | * | 3/2006 |

OTHER PUBLICATIONS

Machine translation of JP 2006-063102 A, Mar. 19, 2006.*
Machine translation of JP 10-017824 A, Jan. 20, 1998.*

\* cited by examiner

*Primary Examiner* — Vickey Nerangis
(74) *Attorney, Agent, or Firm* — Sughrue Mion, PLLC

(57) ABSTRACT

A sealing compound composition as an adhesive composition contains a vinyl chloride resin, a plasticizer, a filler, a moisture absorbent and an acrylic resin as a pH control material. The moisture absorbent is blended within a range of 0.3 to 2.0% by weight. The acrylic resin is blended within a range of 1.0% by weight or more to less than 7.0% by weight. A blending ratio of the moisture absorbent is half or less than that of the acrylic resin.

3 Claims, 1 Drawing Sheet

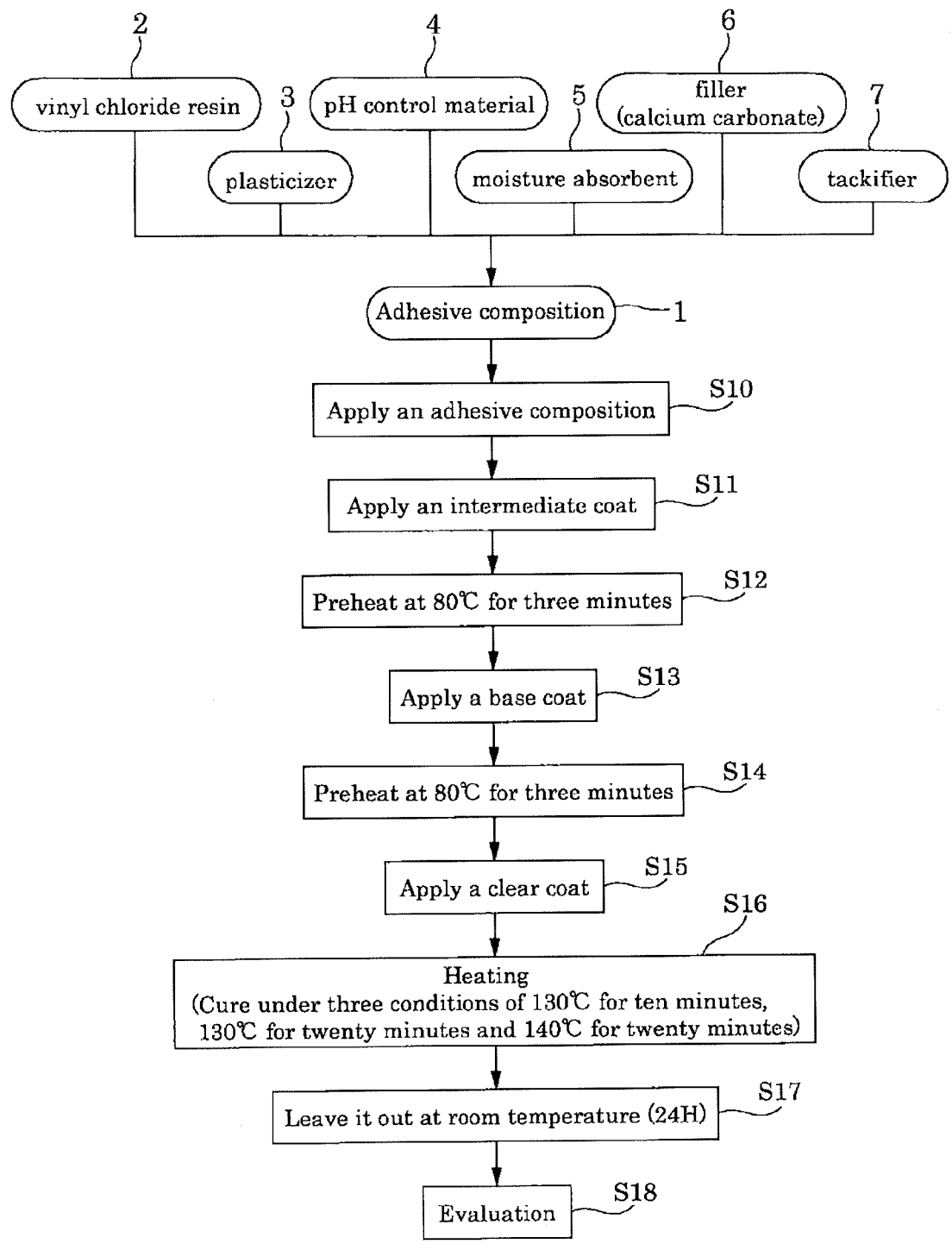

ADHESIVE COMPOSITION

BACKGROUND OF THE INVENTION

1. Field of the Invention

This invention relates to an adhesive composition containing a moisture absorbent, and more particularly to an adhesive composition containing a moisture absorbent that shows a pH property of acidity or alkalinity by absorption of moisture. The term "pH property" as used in this specification, claims, drawing and abstract of the disclosure means acidity, neutrality or alkalinity (basicity) shown by a material, which is the term to describe characteristics of pH (hydrogen ion concentration).

2. Description of the Related Art

A resin is applied to a joint for use in a vehicle such as an automobile so as to allow the joint to have a sealing function (such as watertightness and airtightness). A vinyl chloride resin sealing compound, an acrylic sol sealing compound or the like are used as the sealing compound. Among them, the vinyl chloride resin sealing compound is mainly used from the viewpoints of cost performance, ease in handling or the like.

On the other hand, a three-wet painting technique using a water-based intermediate coat and a water-based top coat that are baked simultaneously has been introduced in a painting or a coating process of a recent automobile production line from the viewpoints of shortening the process with consideration for environmental problems. Even the sealing compound needs to be adaptable to the three-wet painting technique. Moreover, a paint appearance should be similar to a conventional one even after such water paint is applied and then baked. A water resistant test was conducted after applying the water paint to the vinyl chloride resin sealing compound that was mainly used as the sealing compound and then baking. However, according to the test, it was proved that a great number of swellings were generated on a painted surface of the sealing compound, thereby having a problem that a quality in appearance is impaired.

In order to solve such problems in the vinyl chloride resin sealing compound, Japanese Patent Laid-Open Publication No. 7-082549 discloses a vinyl chloride plastisol sealing compound. In the invention described in the Japanese Laid-Open Publication, a polyester plasticizer having a molecular weight of 1500 or more is used as 25 to 60% by weight of a plasticizer which is included in the vinyl chloride plastisol sealing compound. It prevents the plasticizer from being readily extracted from the sealing compound and transferred to the intermediate coat. Moreover, such vinyl chloride plastisol sealing compound has an excellent paint performance so that a phenomenon such as stringiness or dripping off of the sealing liquid is not readily caused in the process of applying the sealing compound.

In the techniques described in the above Japanese Patent Laid-Open Publication No. 7-082549, an effect to improve paintability is obtained at an initial stage. However, the invention also has a problem as follows. That is, a phenomenon is unavoidable that a great number of swellings are generated on a painted surface of the sealing compound when a water resistant test is performed after painting and baking.

The present invention attempts to solve such problems. It is an object of the present invention is to provide an adhesive composition containing a moisture absorbent that shows acidity or basicity by absorption of moisture from a vinyl chloride resin sealing compound or the like, wherein no swelling is generated on a paint surface of the adhesive composition and a quality in paint appearance is maintained even if a water resistant test is performed after applying water paint and baking it.

BRIEF SUMMARY OF THE INVENTION

According to a first aspect of the invention, there is provided an adhesive composition containing a moisture absorbent that shows a pH property of acidity or basicity by absorption of moisture. The adhesive composition contains a pH control material that shows a pH property that is opposite to a pH property that the moisture absorbent shows in absorbing moisture. The term "opposite pH property" as used herein means that it shows basicity if the moisture absorbent shows a pH property of acidity in absorbing moisture and that it shows acidity if the moisture absorbent shows a pH property of basicity in absorbing moisture.

A moisture absorbent "that shows a pH property of acidity in absorbing moisture" as used herein includes phosphorus pentaoxide (P2O5), silica gel (SiO2) or the like. Another moisture absorbent "that shows a pH property of basicity in absorbing moisture" includes calcium oxide (CaO), magnesium oxide (MgO), calcium phosphate, sodium silicate or the like. In addition, a "pH control material that shows acidity" includes an acrylic resin, carbon black or the like. Another "pH control material that shows basicity" includes calcium hydroxide, amine or the like.

According to a second aspect of the invention, in the composition of the first aspect, there is provided an adhesive composition in which the moisture absorbent shows a pH property of basicity in absorbing moisture and the pH control material is an acidic material that shows a pH property of acidity. The moisture absorbent "that shows a pH property of basicity in absorbing moisture" as used herein includes calcium oxide, magnesium oxide, calcium phosphate, sodium silicate or the like.

According to a third aspect of the invention, in the composition of the first aspect, there is provided an adhesive composition in which the pH control material is an acrylic resin.

The "acrylic resin" as used herein includes any acrylic resin selected from a group consisting of a wide variety of acrylic resins and methacrylic resins. It means a single polymer made from a monomer selected from acrylic alkyl ester, methacrylic alkyl ester or the like or a copolymer thereof. More specifically, any monomer selected from a group consisting of various monomers such as methyl acrylate, ethyl acrylate, n-Butyl acrylate, isobutyl acrylate, methyl methacrylate, ethyl methacrylate, n-Butyl methacrylate, isobutyl methacrylate or the like may be used as the monomer.

According to a fourth aspect of the invention, in the composition of the third aspect, there is provided an adhesive composition containing a vinyl chloride resin, a plasticizer and an acrylic resin. The acrylic resin comprises core-shell particles. A core part thereof comprises a polymer having a plasticizer affinity or a plasticizer-philic polymer. A shell part thereof comprises a polymer having no plasticizer affinity or a plasticizer-phobic polymer.

The "vinyl chloride resin" as used herein includes a single polymer of vinyl chloride, a vinyl chloride-vinyl acetate copolymer and a mixture thereof. In addition, dioctyl phthalate (DOP), diisononyl phthalate (DINP) or the like may be used as the "plasticizer".

According to a fifth aspect of the invention, in the composition of the third aspect, there is provided an adhesive composition containing the moisture absorbent within a range of 0.3 to 2.0% by weight and the acrylic resin within a range of 2.0% by weight or more to less than 7.0% by weight, wherein a blending ratio of the moisture absorbent is half or less than that of the acrylic resin.

According to a sixth aspect of the invention, in the composition of the third aspect, there is provided an adhesive composition further containing a tackifier. The "tackifier" as used herein includes polyamide amine, a blocked urethane prepolymer or the like. More specifically, Nourybond 272 manufactured by Air Products Japan Inc. or the like may be used instead.

According to the first aspect of the invention, the adhesive composition contains a moisture absorbent that shows a pH property of acidity or basicity by absorption of moisture. The adhesive composition contains a pH control material that shows a pH property that is opposite to a pH property that the moisture absorbent shows in absorbing moisture.

As a result of extensive experiments and research to study the cause of the phenomenon that a great number of swellings are generated on the painted surface of the above described sealing compound, the present inventors found that calcium oxide as the moisture absorbent included in the sealing compound changes into calcium hydroxide to show basicity by absorption of moisture and that this basic calcium hydroxide lowers both film strength and an adhesive property against a base material. The present inventors reached the present invention based on the above-mentioned knowledge.

That is, the present inventors focused attention on the facts as described below. That is, a moisture absorbent essentially needs to be blended in the adhesive composition in order to prevent an appearance from being impaired by bubbling which is caused by moisture included in the adhesive composition in a subsequent process of baking or the like. However, if the moisture absorbent shows a pH property of acidity or basicity by absorption of moisture, the pH property of acidity or basicity may impair characteristics of the adhesive composition, a paint film coated thereon or the like.

Then, the present inventors decided to add a pH control material to the adhesive composition containing a moisture absorbent that shows a pH property of acidity or basicity by absorption of moisture. That is, the present inventors decided to add a basic pH control material if the moisture absorbent shows a pH property of acidity by absorption of moisture and to add an acid pH control material if the moisture absorbent shows a pH property of basicity by absorption of moisture so as to allow for neutralization even if the moisture absorbent shows a pH property of acidity or basicity by absorption of moisture and to ensure that characteristics of the adhesive composition, the paint film coated thereon or the like are prevented from being impaired by minimizing the effect of acidity or basicity. That is, the pH control material is a material to control a pH change of the adhesive composition, which is caused when the moisture absorbent absorbs moisture.

Thus, there is provided an adhesive composition containing a moisture absorbent that shows acidity or basicity by absorption of moisture from a vinyl chloride resin sealing compound or the like, wherein no swelling is generated on a paint surface of the adhesive composition and a quality in paint appearance is maintained even if a water resistant test is performed after applying water paint and baking it.

According to the second aspect of the invention, the adhesive composition contains a moisture absorbent that shows a pH property of basicity in absorbing moisture and a pH control material that is an acidic material which shows a pH property of acidity. The moisture absorbent includes calcium oxide, magnesium oxide, calcium phosphate or sodium silicate and most of them show a pH property of basicity in absorbing moisture. Therefore, it is advantageous and effective to add an acidic material showing a pH property of acidity as the pH control material to the adhesive composition. Thereby, the second aspect of the invention exhibits further advantages in addition to the effects of the first aspect of the invention.

According to the third aspect of the invention, the adhesive composition contains a pH control material that is an acrylic resin. The adhesive composition is therefore advantageous in that strength of a hardened product is increased, in addition to the effects of the first aspect of the invention.

According to the fourth aspect of the invention, the adhesive composition contains a vinyl chloride resin, a plasticizer and an acrylic resin. The acrylic resin comprises core-shell particles. A core part thereof comprises a polymer having a plasticizer affinity or a plasticizer-philic polymer. A shell part thereof comprises a polymer having no plasticizer affinity or a plasticizer-phobic polymer. Thereby, the polymer in the shell part that has a poor affinity to the plasticizer coats the core part that has an affinity to the plasticizer. Thus, further effects are obtained as follows, in addition to the effects of the third aspect of the invention. That is, an increase in viscosity of an acrylic sol in storage is restrained and storage stability of the adhesive composition is further improved. In addition, there is no possibility of bleeding after the adhesive composition is hardened by heating, since the heating allows the polymer in the shell part to exhibit or activate its affinity to the plasticizer.

According to the fifth aspect of the invention, the adhesive composition contains a moisture absorbent within a range of 0.3 to 2.0% by weight and an acrylic resin within a range of 2.0% by weight or more to less than 7.0% by weight, wherein a blending ratio of the moisture absorbent is half or less than that of the acrylic resin. At least 0.3% by weight of the moisture absorbent should be blended therein to absorb moisture which is included in a component blended in the adhesive composition. That is, if the moisture absorbent is blended in an amount of less than 0.3% by weight, bubbling is caused in the adhesive composition when it is dried by baking. On the other hand, if the moisture absorbent is blended in an amount of more than 2.0% by weight, the adhesive composition has a lower water resistance. It is thus appropriate to blend the moisture absorbent within a range of 0.3 to 2.0% by weight in the adhesive composition.

In addition, if the acrylic resin is blended in an amount of less than 2.0% by weight, it is impossible to have an effect to improve the above-described water resistance. On the other hand, if the acrylic resin is blended in an amount of 7.0% by weight or more, film adhesion is impaired. It is thus appropriate to blend the acrylic resin within a range of 2.0% by weight or more to less than 7.0% by weight. Moreover, the acrylic resin is preferably blended within a range of 2.0 to 5.0% by weight to ensure that the adhesive composition has an effect to improve the water resistance, while assuring the film adhesion.

Furthermore, a blending ratio of the moisture absorbent should be half or less than that of the acrylic resin based on weight. If the blending ratio of the moisture absorbent is more than half of that of the acrylic resin based on weight, the adhesive composition has a lower water resistance. By the additional features as described above, the fifth aspect of the invention exhibits further advantages in addition to the effects of the third aspect of the invention.

According to the sixth aspect of the invention, the adhesive composition further contains a tackifier. A polyamide amine, a blocked urethane prepolymer or the like may be used as the "tackifier". More specifically, Nourybond 272 manufactured by Air Products Japan Inc. or the like may be used instead.

The adhesive composition is advantageous in that it blends such a tackifier including a polyamide amine, a blocked urethane prepolymer or the like. That is, the blending of the tackifier makes it possible to ensure the film adhesion even if an extra acrylic resin is blended (within a range of more than 5.0% by weight to less than 7.0% by weight). The tackifier is preferably blended within a range of 0.5 to 2.0% by weight.

BRIEF DESCRIPTION OF THE SEVERAL VIEWS OF THE DRAWINGS

FIG. 1 is a flowchart showing a procedure for measuring performance of an adhesive composition according to an embodiment of the invention.

DETAILED DESCRIPTION OF THE INVENTION

A preferred embodiment of the invention is described hereunder referring to FIG. 1. FIG. 1 is a flowchart showing a procedure for measuring performance of an adhesive composition according to an embodiment of the invention.

A component that is blended in the adhesive composition according to the embodiment of the invention and a blending ratio thereof are described first. The adhesive composition according to the embodiment of the invention contains an adhesive resin, a plasticizer, a moisture absorbent that shows basicity by absorption of moisture, a pH control material, a filler and a tackifier.

P500 that is a vinyl chloride-vinyl acetate copolymer manufactured by V-tech Corporation is used as a "vinyl chloride resin" which is treated as the adhesive resin herein. Diisononyl phthalate (DINP) manufactured by J-Plus Co., Ltd. is used as the "plasticizer". Calcium carbonate is used as the "filler". The calcium carbonate as used herein is prepared by mixing a fine calcium carbonate and a coarse calcium carbonate. HAKUENKA CCR manufactured by Shiraishi Kogyo Kaisha Ltd. is used as the fine calcium carbonate. Ultra Fine Ground Calcium Carbonate manufactured by Takehara Kagaku Kogyo Co., Ltd. is used as the coarse calcium carbonate.

In addition, QC-X that is calcium oxide manufactured by Inoue Calcium Corporation is used as the "moisture absorbent". DIANAL LP-3102 manufactured by Mitsubishi Rayon Corporation is used as an "acrylic resin" which is treated as the "pH control material" herein. Mitsubishi carbon black MA-100 manufactured by Mitsubishi Chemical Corporation is used as carbon black. The DIANAL LP-3102 as the acrylic resin comprises core-shell particles having a core part. The core part comprises a polymer that has an affinity to a plasticizer or is a plasticizer-philic. The DIANAL LP-3102 also has a shell part. The shell part comprises a polymer that has no affinity to a plasticizer or is a plasticizer-phobic. Moreover, Nourybond 272 manufactured by Air Products Japan Inc. is blended as the "tackifier".

Five kinds of sealing compound compositions as first to fifth examples of "adhesive compositions" were prepared by mixing these compounds. In addition, seven kinds of sealing compound compositions were prepared for comparison as first to seventh comparative examples of adhesive compositions. A component and a blending ratio of each of the first to fifth examples and the first to seventh comparative examples of twelve kinds of adhesive compositions are shown in upper part of TABLE 1.

TABLE 1

| Sol Composition | | List of Material (Manufacturer) | First Example | Second Example | Third Example | Fourth Example | Fifth Example | First Comparative Example | Second Comparative Example | Third Comparative Example | Fourth Comparative Example | Fifth Comparative Example | Sixth Comparative Example | Seventh Comparative Example |
|---|---|---|---|---|---|---|---|---|---|---|---|---|---|---|
| Acrylic Resin | | DIANAL LP-3102 (Mitsubishi Rayon Corporation) | 2 | 5 | 5 | — | — | 1 | 2 | 7 | 7 | — | — | — |
| Carbon Black | | MA-100 (Mitsubishi Chemical Corporation) | — | — | — | 2 | 5 | — | — | — | — | — | — | — |
| Moisture Absorbent | | QC-X (Inoue Calcium Corporation) | 1 | 1 | 2 | 1 | 2 | 1 | 2 | 1 | 2 | 1 | 2 | — |
| Vinyl Chloride Resin | | P-500 (V-Tech Corporation) | 20 | 17 | 17 | 20 | 17 | 21 | 20 | 15 | 15 | 22 | 22 | 22 |
| Plasticizer | | DINP (J-Plus Co., Ltd.) | 30 | 30 | 30 | 30 | 30 | 30 | 30 | 30 | 30 | 30 | 30 | 30 |
| Calcium Carbonate | Fine Particles | HAKUENKA CCR (Shiraishi Kogyo Kaisha, Ltd.) | 26 | 26 | 25 | 26 | 25 | 26 | 25 | 26 | 25 | 26 | 25 | 27 |
| | Coarse Particles | Ultra Fine Ground Calcium Carbonate (Takehara Kagaku Kogyo Co., Ltd.) | 20 | 20 | 20 | 20 | 20 | 20 | 20 | 20 | 20 | 20 | 20 | 20 |

TABLE 1-continued

| Sol Composition | List of Material (Manufacturer) | Blending Ratio (Part by Weight) | | | | | | | | | | | |
|---|---|---|---|---|---|---|---|---|---|---|---|---|---|
| | | First Example | Second Example | Third Example | Fourth Example | Fifth Example | First Comparative Example | Second Comparative Example | Third Comparative Example | Fourth Comparative Example | Fifth Comparative Example | Sixth Comparative Example | Seventh Comparative Example |
| Tackifier | Nourybond 272 (Air Products Japan Inc.) | 1 | 1 | 1 | 1 | 1 | 1 | 1 | 1 | 1 | 1 | 1 | 1 |
| Total | | 100 | 100 | 100 | 100 | 100 | 100 | 100 | 100 | 100 | 100 | 100 | 100 |
| Evaluation Item | | Evaluation Result | | | | | | | | | | | |
| Painted Surface Condition after testing Water Resistance | Cure at 130° C. for ten minutes | G | G | G | G | G | NG | NG | G | G | NG | NG | G |
| | Cure at 130° C. for twenty minutes | G | G | G | G | G | NG | NG | G | G | NG | NG | G |
| | Cure at 140° C. for twenty minutes | G | G | G | G | G | G | G | G | G | NG | NG | G |
| Film Adhesion after testing Water Resistance (Cure at 140° C. for twenty minutes) | | Pass | Pass | Pass | Pass | Pass | Pass | Pass | Fail | Fail | Fail | Fail | Pass |
| Condition of a Cured Product | | OK | OK | OK | OK | OK | OK | OK | OK | OK | OK | OK | Internal Bubble |
| Storage Stability (After 10 days at 35° C.) | | OK | OK | OK | OK | OK | OK | OK | NG | NG | OK | OK | OK |

G (good): No damage is observed.
NG: Swelling is generated on a paint film.

As shown in the upper part of TABLE 1, various blending ratios were used. Specifically, the acrylic resin was blended in a proportion of 2% by weight, 5% by weight and 5% by weight in the first to third examples, respectively. The carbon black was blended in a proportion of 2% by weight and 5% by weight in the fourth and fifth examples, respectively. In addition, the moisture absorbent was blended in a proportion of 1% by weight, 1% by weight, 2% by weight, 1% by weight and 2% by weight in the first to fifth examples, respectively. Accordingly, the vinyl chloride resin was blended in a proportion of 20% by weight, 17% by weight, 17% by weight, 20% by weight and 17% by weight in the first to fifth examples, respectively. In addition, the fine calcium carbonate was blended in a proportion of 26% by weight, 26% by weight, 25% by weight, 26% by weight and 25% by weight in the first to fifth examples, respectively.

The plasticizer was blended in a fixed amount of 30% by weight in each of the first to fifth examples of adhesive compositions. Similarly, the coarse calcium carbonate and the tackifier were blended in a fixed amount of 20% by weight and 1% by weight, respectively so as to make a total sum to 100% by weight in each of the first to fifth examples of adhesive compositions.

On the other hand, the acrylic resin was blended in a proportion of 1% by weight, 2% by weight, 7% by weight and 7% by weight in the first to fourth comparative examples, respectively. A blending quantity of the acrylic resin of the first comparative example was less than that of the first example. Another blending quantity of the acrylic resin of the third and forth comparative examples was greater than that of the third and forth examples. No acrylic resin and no carbon black were blended in the fifth to seventh comparative examples. In addition, the moisture absorbent was blended in a proportion of 1% by weight, 2% by weight, 1% by weight, 2% by weight, 1% by weight and 2% by weight in the first to sixth comparative examples, respectively. No moisture absorbent was blended in the seventh comparative example.

Accordingly, the vinyl chloride resin was blended in a proportion of 21% by weight, 20% by weight, 15% by weight, 15% by weight, 22% by weight, 22% by weight and 22% by weight in the first to seventh comparative examples, respectively. In addition, the fine calcium carbonate was blended in a proportion of 26% by weight, 25% by weight, 26% by weight, 25% by weight, 26% by weight, 25% by weight and 27% by weight in the first to seventh comparative examples, respectively.

The plasticizer was blended in a fixed amount of 30% by weight in each of the first to seventh comparative examples of adhesive compositions. Similarly, the coarse calcium carbonate and the tackifier were blended in a fixed amount of 20% by weight and 1% by weight, respectively so as to make a total sum 100% by weight in each of the first to seventh comparative examples of adhesive compositions.

Performance as a sealing compound was measured on the sealing compound compositions of the first to fifth examples and the first to seventh comparative examples as twelve kinds of adhesive compositions. A procedure for measuring performance of an adhesive composition is described referring to FIG. 1. FIG. 1 is a flowchart showing a procedure for measuring performance of an adhesive composition according to an embodiment of the invention.

As shown in FIG. 1, a sealing compound composition 1 as an adhesive composition was prepared first by mixing a vinyl chloride resin 2, a plasticizer 3, a pH control material 4, a moisture absorbent 5, a filler 6 and a tackifier 7. The sealing compound composition 1 as the adhesive composition was applied to an electrodeposited plate (70 mm×150 mm×0.8 mm) to give a coated surface of 50 mm×100 mm in size and 3 mm in thickness (S10).

An intermediate coat was applied thereon to have a thickness of 10 μm (S11) and preheating was performed at 80° C. for three minutes (S12). Next, a base coat was applied to have a thickness of 10 μm (S13) and preheating was performed at 80° C. for three minutes (S14). At the end, a clear coat was applied to have a thickness of 10 μm (S15) and heating was performed to harden a paint film (S16).

The heating was performed under three conditions of 130° C. for ten minutes, 130° C. for twenty minutes and 140° C. for twenty minutes. A thermometer was attached to the other side of the electrodeposited plate. Curing was started upon reaching a predetermined temperature here. In addition, WP-500T (soluble), WBC-713T (soluble) and KINO-1210TW (oily) that were manufactured by Kansai Paint Co., Ltd. were used as the intermediate coat, base coat and clear coat, respectively.

Then, the electrodeposited plate having a hardened paint film was left at room temperature for 24 hours (S17) and water resistance was measured using a specimen thus prepared (S18). That is, the specimen was immersed in a constant temperature bath containing water kept at 40° C. for 10 days and was taken out to observe a surface condition. Evaluation is shown as follows. "G" (good): No damage was observed. "NG": Swelling was observed on the paint film.

In addition, a specimen was prepared in the same manner as in the water resistant test (except that a condition of heating in S16 herein was at 140° C. for twenty minutes) to measure film adhesion. That is, the specimen thus prepared was similarly immersed in the constant temperature bath containing water kept at 40° C. for 10 days and was taken out to remove moisture completely from its surface. The specimen was left at a temperature of 20° C. for 24 hours. A cut was then made on a paint film at intervals of 2 mm with a cutter knife to form one hundred squares or cells thereon. An adhesion test was carried out with cellophane tape. The number of cells having a peeled part of 50% or more of a total surface area was counted. Evaluation is shown as follows. "Pass": No cell was counted (peeled). "Fail": One or more cells were counted (peeled).

Further, the adhesive composition was applied to another electrodeposited plate having the same size as above and was hardened by heating. A hardened product thus prepared was examined if an internal bubble was observed therein or not. That is, the adhesive composition 1 was applied to the electrodeposited plate (70 mm×150 mm×0.8 mm) so as to give a surface of 15 mm×100 mm in size and 3 mm in thickness. The electrodeposited plate was cured hardened by heating at 140° C. for twenty minutes and was cooled down to a room temperature. A cut was made on a paint film of the adhesive composition with a cutter knife to check for the internal bubble. Evaluation is shown as follows. "OK": No internal bubble was observed therein.

In addition, the first to fifth examples and the first to seventh comparative examples of twelve kinds of adhesive compositions were left at a temperature of 35° C. for 10 days to measure storage stability. A specific test method thereof was as follows. Each of the adhesive compositions was left out at a temperature of 35° C. for 10 days to measure viscosity with an SOD pressure viscometer provided for in ASTM 1092. Evaluation is shown as follows. "OK": The viscosity was 3.0 Pas at a shear rate of 10000 s−1 or less. "NG": The viscosity was 20 Pas at a shear rate of 10000 s−1 or more. Obtained evaluation results were shown in lower part of TABLE 1.

As shown in the lower part of TABLE 1, in the water resistant test which is one of the above-described evaluation items, it was found or proved that the first to fifth examples and the first to seventh comparative examples of adhesive compositions were excellent in the water resistance without swelling on the paint film under all of the three conditions of heating. On the other hand, swelling was observed on the paint film in the first and second comparative examples when heating was performed under the conditions of 130° C. for ten minutes and 130° C. for twenty minutes. In addition, swelling was generated on the paint film of the fifth and sixth comparative examples under all of three conditions of the heating, which proved that they had a problem with water resistance.

In film adhesion, the first to third examples of adhesive compositions had an evaluation value of "Pass" which meant that no cell was counted as a cell having a peeled part after testing film adhesion. The test proved that they were excellent in the film adhesion. On the other hand, the third to sixth comparative examples of adhesive compositions had an evaluation value of "Fail" which meant one or more cells were peeled off in testing film adhesion. The test proved that they had a problem with film adhesion.

In an internal bubble of the hardened product, the first to fifth examples of adhesive compositions had an evaluation value of "OK" which meant that any damage including the internal bubble was not observed therein. However, the internal bubble was observed in the seventh comparative example of adhesive composition in which no moisture absorbent (calcium oxide) was blended therein. Accordingly, obtained result proved that at least minimum amount of moisture absorbent (0.3% by weight of calcium oxide) needed to be blended therein.

In storage stability, each of the first to fifth examples of adhesive compositions had an evaluation value of "OK" which meant that the viscosity was 3.0 Pas at a shear rate of 10000 s−1 or less. Obtained result proved that they were excellent in storage stability even after 10 days. On the other hand, the third and fourth comparative examples of adhesive compositions had an evaluation value of "NG" which meant that the viscosity was 20 Pas at a shear rate of 10000 s−1 or more and it was found that they had a problem with storage stability.

The above evaluation results are summed up that the sealing compound compositions as the first to seventh comparative examples of adhesive compositions have a problem with any one of water resistance, film adhesion, internal bubble and storage stability, thereby being useless as the sealing compound. On the other hand, the sealing compound composition 1 that is used as the first to fifth examples of adhesive compositions has passed all the tests covering water resistance, film adhesion, internal bubble and storage stability. Obtained result proves that the sealing compound composition 1 has excellent characteristics as the sealing compound.

Accordingly, obtained results prove that the adhesive composition containing a vinyl chloride resin, a plasticizer, a filler, a moisture absorbent and an acrylic resin must meet the conditions as follows. The moisture absorbent should be blended within a range of 0.3 to 2.0% by weight. The acrylic resin should be blended within a range of 1.0% by weight or more to less than 7.0% by weight. A blending ratio of the moisture absorbent should be half or less than that of the acrylic resin.

In addition, the sealing compound composition 1 which is used as the first and fifth examples of adhesive compositions according to the embodiment of the invention can keep its condition and state even after it is preserved at room temperature for a long period of time. Thus, it is excellent in preservation stability. Accordingly, obtained results prove that, for the adhesive composition containing a vinyl chloride resin, a plasticizer, a filler, a moisture absorbent and an acrylic resin, it is preferable to contain the acrylic resin that comprises the core-shell particles, wherein a core part thereof includes a polymer having an affinity to the plasticizer (or a plasticizer-philic polymer) and a shell part thereof includes a polymer having no affinity to the plasticizer (or a plasticizer-phobic polymer).

Thus, the sealing compound composition 1 as the first to fifth examples of adhesive compositions is able to keep a quality in paint appearance without generating swelling on the painted surface of the sealing compound in the vinyl chloride resin sealing compound even after the water resistant test. That is, even if the water resistant test is performed after painting and baking the water paint containing the sealing compound composition 1, which is used for the three-wet painting technique, the paint appearance quality is maintained as before.

In the present invention, there is provided an adhesive composition that contains a pH control material to control a pH change of the adhesive composition, thereby preventing an adverse effect resulting from the pH change of the adhesive composition by absorption of the moisture. With such characteristic features, the present invention may be applied to other resins and products, in addition to the vinyl chloride resin and the sealing compound. For example, the present invention is applicable to a structural adhesive for automobile. The structural adhesive uses an epoxy resin. Calcium oxide or the like as a moisture absorbent is blended therein in the same manner as in the example of the present invention so as to prevent a bubble caused by absorption of the moisture. Thereby, an amount of the moisture is controlled at the time of use. In this case, if an excessive amount of the moisture absorbent is blended, it excessively increases a pH change, thereby affecting an adhesion capability. Therefore, the amount of the moisture absorbent that can be used in the adhesive is limited. That is, an amount of the moisture that can be absorbed is limited. However, if the present invention is applied to the structural adhesive, the pH change can be controlled or restrained. Thus, the usable amount of the moisture absorbent can be increased, thereby making easy the control of the amount of the moisture. In addition, the present invention is also applicable to the case in which a water-based material is coated by the time it is hardened by heating as described in the present example, since it is necessary to increase the amount of the moisture absorbent in such case.

In the present embodiment, the calcium oxide (CaO) that shows a pH property of basicity by absorption of moisture is used as the "moisture absorbent" and the acrylic resin or carbon black that shows a pH property of acidity, which is the opposite property, is used as the "pH control material". Still, the "moisture absorbent" and the "pH control material" are not limited to them, as long as they do not affect the quality of the adhesive composition. In addition, the moisture absorbent that shows a pH property of basicity by absorption of moisture is not limited to calcium oxide. Magnesium oxide (MgO), calcium phosphate, sodium silicate or the like may be used instead.

The moisture absorbent further includes phosphorus pentaoxide ($P_2O_5$), silica gel ($SiO_2$) or the like, which shows a pH property of acidity by absorption of moisture. Such a moisture absorbent should be blended with calcium hydroxide, amine or the like that shows a pH property of basicity, which is the opposite property.

The present embodiment uses DIANAL LP-3102 manufactured by Mitsubishi Rayon Corporation as the "acrylic resin", which comprises core-shell particles including a core part and a shell part, wherein the core part comprises a polymer having an affinity to the plasticizer and a shell part comprises a polymer having no affinity to the plasticizer. However, the acrylic resin is not limited to the core-shell particles type polymer. It may be any one of various acrylic resins and methacrylic resins. That is, it may be a single polymer or a copolymer of a monomer selected from an acrylic alkyl ester, a methacrylic alkyl ester or the like. More specifically, one selected from various monomers including a methyl acrylate, an ethyl acrylate, an n-Butyl acrylate, an isobutyl methacrylate and the like may be used instead.

In the present embodiment, the calcium carbonate is used as the "filler" in the examples. However, a barium sulfate, a calcium sulfate, a talc, a diatomaceous earth, a clay, a mica or the like may be used instead. In addition, though, the diisononyl phthalate (DINP) is used as the "plasticizer" in the present embodiment, the plasticizer is not limited thereto. Dioctyl phthalate (DOP) or the like may be used instead.

In the present embodiment, the water-based coats are used as an intermediate coat and a base coat among the intermediate, base and clear coats that are used for the three-wet painting technique. However, the intermediate coat and the base coat are not limited to the water-based coats.

In addition, the present embodiment is applied to the sealing compound for automobile. However, the sealing compound may be applied to general adhesive compositions such as a structural adhesive for automobile and an adhesive for building products, wherein a moisture absorbent is blended therein to control affection by moisture.

The present invention is not limited to the present embodiment and each example with respect to a structure, a composition, blending, components, a shape, quantity, a material, a size, a manufacturing method or the like of other parts of the adhesive composition. In addition, not all of the numeric values described in the present embodiment of the invention indicate a critical value, and a certain numeric value indicates an appropriate value which is suitable for the embodiment. Even if the above numeric values may be changed slightly, the present invention can be practiced as well.

The preferred embodiments described herein are illustrative and not restrictive, the scope of the invention being indicated in the appended claims and all variations which come within the meaning of the claims are intended to be embraced therein.

The invention claimed is:

1. An adhesive composition, containing an adhesive resin, a moisture absorbent showing a pH property of acidity or basicity by absorption of moisture, and a pH control material showing a pH property opposite to the pH property that the moisture absorbent shows when absorbing the moisture, and a plasticizer,
    wherein the adhesive resin is a vinyl chloride resin,
    wherein the pH control material is an acrylic resin consisting of core-shell particles including a core part and a shell part, the core part comprising a polymer having an affinity to the plasticizer and the shell part comprising a polymer having no affinity to the plasticizer,
    wherein the moisture absorbent is blended within a range of 0.3 to 2.0% by weight and the acrylic resin as the pH control material is blended within a range of 2.0% by weight or more to less than 7.0% by weight, and
    wherein a blending ratio of the moisture absorbent is not more than one half of a blending ratio of the acrylic resin as the pH control material.

2. An adhesive composition according to claim 1, in which the moisture absorbent shows a pH property of basicity when absorbing the moisture, and the pH control material is an acidic material showing a pH property of acidity.

3. An adhesive composition according to claim 1, further containing: a tackifier.

* * * * *